United States Patent [19]

Dorn et al.

[11] 4,038,150

[45] July 26, 1977

[54] SAMPLE MIXING AND CENTRIFUGATION APPARATUS

[75] Inventors: Gordon L. Dorn; Joseph M. Hill, both of Dallas, Tex.

[73] Assignee: J. K. and Susie L. Wadley Research Institute and Blood Bank, Dallas, Tex.

[21] Appl. No.: 669,764

[22] Filed: Mar. 24, 1976

[51] Int. Cl.[2] .................... C12K 1/04

[52] U.S. Cl. .................... 195/127; 128/218 M; 128/272; 195/103.5 M

[58] Field of Search .................... 195/127, 139; 128/218 M, 272

[56] References Cited

U.S. PATENT DOCUMENTS

| | | | |
|---|---|---|---|
| 3,875,012 | 4/1975 | Dorn et al. | 195/103.5 R |
| 3,928,139 | 12/1975 | Dorn | 195/103.5 R |
| 3,932,222 | 1/1976 | Dorn | 195/127 |

*Primary Examiner*—Alvin E. Tanenholtz
*Assistant Examiner*—Robert J. Warden
*Attorney, Agent, or Firm*—Richards, Harris & Medlock

[57] ABSTRACT

An apparatus for mixing fluids especially suitable for use in laboratory tests for the detection of microbial pathogens which includes an elongated centrifugation vessel, an injectable closure, completely enclosing a treating fluid chamber, and a novel stylus which causes a sample to be admixed and commingled with a treating fluid upon injection. The treating fluid is disposed within the treating fluid chamber and a sterile aqueous solution having a greater density than a sample fluid but able to selectively receive microbial pathogens from the sample fluid is disposed within an evacuated space within the centrifugation vessel. The sample is mixed with the treating fluid when the novel stylus is injected through the injectable closure means facilitating contact of the treating fluid and the sample via an aperture or apertures longitudinally spaced along the stylus so as to be within the treating fluid chamber upon injection of the stylus. The sample-treating fluid mixture then continues its flow through the canalis of the stylus and is deposited on the aqueous solution within the evacuated space of the centrifugation vessel.

53 Claims, 11 Drawing Figures

SAMPLE MIXING AND CENTRIFUGATION APPARATUS

BACKGROUND OF THE INVENTION

In one aspect this invention relates to a novel means of mixing a treating fluid with a sample fluid. In another aspect, this invention relates to a fluid mixing and centrifugation apparatus. In still another aspect, this invention relates to an apparatus to be used in the detection of microbial pathogens.

One of the most serious types of blood infections known today is septicemia which is the presence of microorganisms in the blood. The mortality rate for patients who contract septicemia is approximately 25 percent. Furthermore, when stock accompanies septicemia, the mortality rate increases to an alarming 60 percent. Of those particularly susceptible to septicemia are patients who are suffering from debilitating disease, undergoing major surgery, receiving immunosuppressive drugs, or anti-cancer medications.

Because septicemia can cause rapid deterioration of a patient's condition, early diagnosis and treatment are imperative. It is important that a physician not only know that a patient is suffering from septicemia, but also that he be able to readily identify the particular infecting microorganisms. Therefore, a rapid and efficient method of quantitatively analyzing a patient's blood is the first requirement for treating the disease.

The conventional method and equipment which are utilized to detect the presence of microorganisms in the blood suffer from one or more serious drawbacks. These include, lengthy detection time, inability to distinguish different types of microbial pathogens in a blood sample, and the fact that many of these methods do not provide quantitative information. Another major drawback is the risk of contamination by the ambient conditions of the laboratory or by laboratory personnel.

Recently, an improved method of microbial detection has been developed which is extremely rapid and quantitative, and minimizes contamination of the sample from laboratory environment or personnel. This method is disclosed in U.S. Pat. No. 3,928,139, issued Dec. 23, 1975 and entitled "Detection of Microbial Pathogens". According to this improved method for the detection of microbial pathogens, a sample of body fluid such as blood (preferably a lysed blood sample) is deposited upon a liquid filter medium within the confined sterile zone. The liquid filter medium has a density greater than the sample fluid and comprises a sterile aqueous solution which will selectively receive microbial pathogens from the sample fluid. Thereafter, the confined sterile zone is subjected to centrifugation to force the sample fluid against the liquid filter medium and cause the microbial pathogens to selectively pass therein and thereby separate from the mass of the body fluid sample. Next, the liquid filter medium containing the microbial pathogens is separated from the remainder of the sample fluid and portions of the liquid filter medium are subjected to culturing conditions. Improved types of apparatus for carrying out this novel method are disclosed in U.S. Pat. No. 3,875,012, issued Apr. 1, 1975 entitled "Apparatus and Method for the Detection of Microbial Pathogens" and in Applicant's copending application Ser. No. 535,148, filed Dec. 20, 1974 entitled "Mixing and Centrifugation Device".

STATEMENT OF THE INVENTION

According to one embodiment of the subject invention, an improved mixing and centrifugation apparatus is provided which comprises an elongated centrifugation vessel, enclosing an evacuated space, and an injectable closure means on one end thereof which contains a sample treating fluid chamber therewithin. Sample treating fluid is disposed within the treating fluid chamber. A unique stylus is provided which has apertures along its wall, longitudinally spaced so that upon injection of the stylus into the closure means at least one aperture communicates with the treating fluid chamber. Upon injection of a sample into the evacuated space of the centrifugation vessel, the sample becomes admixed and commingled with the sample treating fluid. The mixing is facilitated by the aperture (or apertures) in the unique stylus which allows the sample to come into contact and mix with the sample treating fluid as both fluids are ejected into the evacuated space of the centrifugation vessel.

In accordance with the preferred embodiment of the subject invention, a liquid filter medium which has a greater density than the sample fluid to be deposited therein and which will selectively receive microbial pathogens from the sample fluid is positioned within the evacuated space of the centrifugation vessel, and the second end of the centrifugation vessel opposite the first end is sealed with a second injectable closure means.

In accordance with another preferred embodiment of the subject invention, the above-described centrifugation and mixing apparatus is provided with a syringe means for removing the liquid filter medium from the evacuated space which includes a stylus which has a closed tip and an aperture (or apertures) spaced along its wall in a manner such that upon passage through the second injectable closure means the apertures will be in close proximity to the inner face of the second closure means. It is noted that when drawing off of the liquid filter medium a small amount of the sample fluid above the interface of the liquid filter medium should be withdrawn in order to assure that microorganisms at the interface are collected. Thus, when the syringe is used to remove the liquid filter medium contained within the centrifugation vessel, it will be drawn uniformly toward the inner face of the second closure means and into the aperture(s) of the stylus in a manner to thereby prevent the intake into the syringe of portions of the sample fluid in excess of a small amount above the interface of the liquid filter medium.

SHORT DESCRIPTION OF THE DRAWINGS

This invention can be more easily understood from a study of the drawings in which.

DETAILED DESCRIPTION OF THE INVENTION

Figures 1, 2, 3, 4, 5, 6, 7, 8:
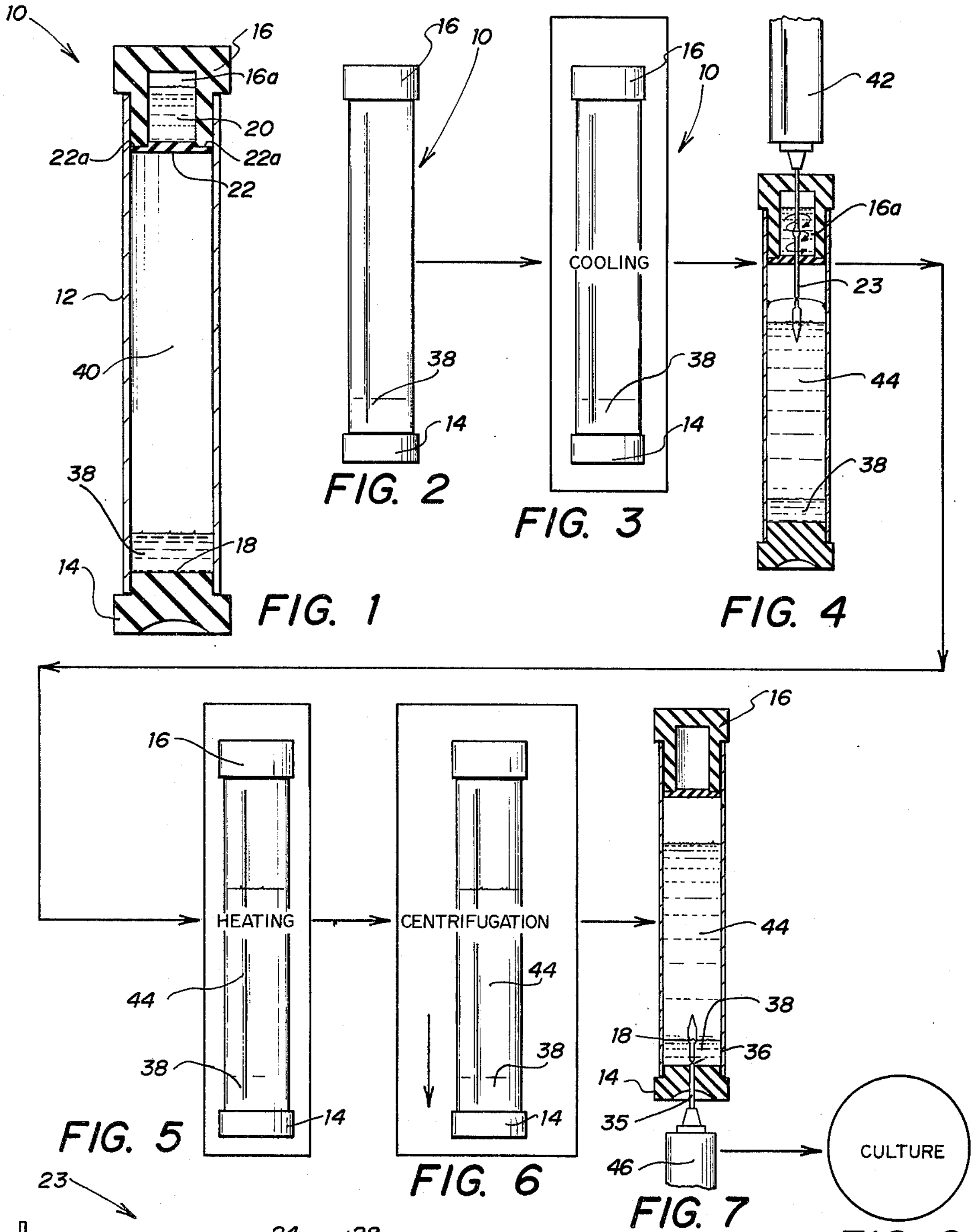
FIG. 1 is a sectional view of a preferred mixing and centrifugation device of the subject invention.
FIGS. 2-8 are schematic illustrations depicting a process for detecting microbial pathogens employing the device of FIG. 1.
Figure 9:
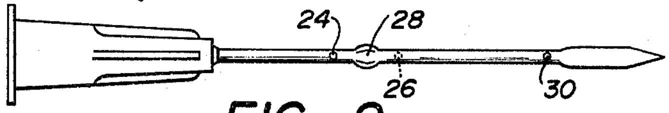
FIGS. 9 and 10 are two views of the unique stylus used for injecting a sample into the centrifugation device.

The novel mixing and centrifugation device 10 of the subject invention is illustrated in cross section in FIG. 1 and is used in conjunction with a unique stylus such as that depicted in FIG. 9. As shown, the mixing and centrifugation device 10 comprises an elongated tubular centrifugation vessel 12, having an injectable closure member 14 which sealably closes the lower end thereof, and an injectable closure member 16 which sealably closes the upper end thereof.

Centrifugation vessel 12 can be made of glass or hard plastic such as polycarbonate or polypropylene. Injectable closure members 14 and 16 can comprise rubber self-sealing stoppers. Injectable closure member 14 comprises a flat inner surface 18 which forms a substantially perpendicular angle with the wall of the centrifugation vessel. This flat inner surface has been found to be helpful in the prevention of sedimentation of microbial pathogens on an up raised inner lip which is carried by conventional injectable closure members for tubes and the like. Furthermore, the flat inner surface facilitates a clear view of the sample-filter medium mixture during the separation steps of the test for microbial pathogens discussed below.

Treating fluid chamber 16*a* is contained within injectable closure member 16 and contains a sample treating fluid 20. The treating fluid chamber is formed by adhesively bonding an end plug 22 to the open end of a hollow tubular closure member at regions 22*a*. End plug 22 does not disintegrate upon injection of a stylus therethrough. As a result, treating fluid chamber 16*a* retains its structural integrity upon penetration. Thus, mixing of the sample treating fluid with the sample is not accomplished by allowing both fluids to spill into the evacuated space 40 together. Instead a unique stylus, as described below, is employed to accomplish thorough mixing of the fluids within the treating fluid chamber and/or the canalis of the stylus.

As shown, the treating fluid chamber is generally disposed centrally within the injectable closure member 16 and is generally cylindrical in shape. However, the treating fluid chamber may be of any convenient shape and volume depending upon the sample treating fluid which is to be employed. Futhermore, its central location is not mandatory since it may be disposed anywhere within an injectable closure member so long as an injection needle may pass through it and communicate with the evacuated space of the centrifugation vessel. It is preferred that the sample treating fluid be injected into the treating fluid chamber through the side of the injectable closure member 16 with a common syringe. Once injected in this manner and injectable closure member 16 is positioned in the end of centrifugation vessel 12, the sample treating fluid will not leak out of the treating fluid chamber because the puncture hole is covered by the wall of the glass tubing. Alternatively, the sample treating fluid may be deposited within the treating fluid chamber before end plug 22 is adhesively bonded to the injectable closure member 16 at regions 22*a*.

Figure 10:
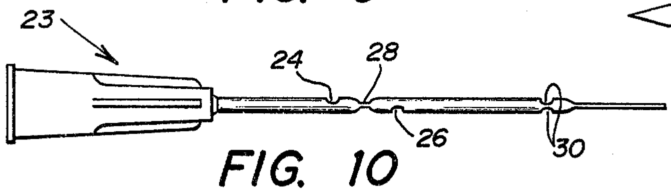

FIGS. 9 and 10 depict two views of the preferred embodiment of the stylus 23 of the apparatus which is used to inject the sample into the centrifugation vessel. This preferred stylus comprises at least two apertures 23 and 26 in the stylus wall longitudinally spaced along the stylus such that upon injection both apertures are contained within the treating fluid chamber 16*a*. Additionally, a blocking means 28, i.e., a crimp is located between the two apertures to prevent communication in the canalis of the stylus between apertures 24 and 26, so that an injected sample is forced to flow out of aperture 24 and enter the treating fluid chamber 16*a*. The aperture 26 below the blocking means is in communication with the evacuated space of the centrifugation vessel via the canalis of the stylus and apertures 30. Thus, as the sample is injected it is forced out of the stylus 23 via aperture 24 and into the treating fluid chamber 16*a*. The resulting turbulence in the treating fluid chamber causes intense mixing of the sample with the sample treating fluid 20. The sample-sample treating fluid mixture then re-enters stylus 23 via the second aperture 26 disposed within the treating fluid chamber and is pulled by the vacuum of the evacuated space 40 of the centrifugation vessel through the lower part of the canalis of the stylus and finally passes out apertures 30 adjacent the end of the stylus 23 and is deposited on a filter medium.

A multiple of apertures may be used either above the blocking means or below it or both. The blocking means can be in the form of a plug within the canalis of the stylus or as shown in FIGS. 9 and 10 the blocking of the canalis between the two apertures may be accomplished by collapsing the walls of the stylus at that point. The tip of the stylus may be any conventional syringe type stylus tip. However, a flattened spade-like tip 32 with two apertures 30 directly above it is preferred in order to aid in the even distribution of the sample-sample treating fluid mixture into the evacuated space 40 of centrifugation vessel 12.

It has been found that two apertures separated by a blocking means are not strictly necessary to accomplish thorough mixing. Accordingly, one aperture longitudinally spaced along the wall of the stylus so as to communicate with the treating fluid chamber upon injection is sufficient. Upon injection of a sample, the aperture within the treating fluid chamber aspirates the treating fluid into the canalis of the stylus and the treating fluid is thoroughly mixed with the sample therein. The sample-treating fluid mixture is then deposited in the evacuated space 40 within centrifugation vessel 12.

Figure 11:
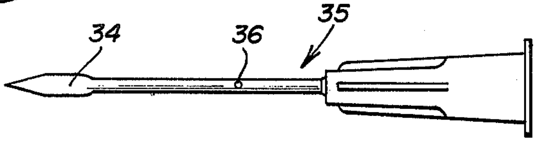
FIG. 11 is a view of a unique stylus used for removing and separating a portion of the liquid filter medium contained within the centrifugation vessel.

FIG. 11 shows a novel stylus 35 which is used to remove a thin layer of fluid adjacent the flat inner surface 18 of the second injectable closure member 14. The stylus 35 may be of any length which is sufficient to pierce the second injectable closure member. The distinguishing features are that the tip 34 of the stylus 35 is closed off and at least one aperture 36 is longitudinally spaced along the wall of the stylus such that upon full injection of the stylus through the second injectable closure member 14, the aperture(s) 36 are positioned slightly above the flat inner surface 18 of the second injectable closure member 14. In the preferred embodiment of FIG. 11, the tip 34 of the stylus 35 has been flattened to seal it and two coaxial apertures 36 are positioned through the wall of the stylus 34. As is apparent, the longitudinal distance from the apertures to the stylus base should be slightly greater than the thickness of the second injectable closure member 14. The length of the stylus from the apertures 36 to its tip 34 may be determined as a matter of convenience. Because of the closely adjacent position of the apertures of the stylus to the flat inner surface on the second injectable closure means generally uniform portions across a cross sectional segment of the fluid within centrifugation device 10 will be simultaneously removed therefrom via apertures 36. The ability to uniformly remove fluid from the bottom of the centrifugation vessel facilitates the necessary separation of a liquid filter medium which contains the microbial pathogens from the remaining portions of the sample-filter medium mixture. This is true because it has been found that if a conventional needle is used (having an open end) the action of the fluid being drawn therein will cause a cone-shaped fluid flow through the gradient which results in undesirable quantities of the fluid sample being passed therein. As a result, portions of the liquid filter medium will not be removed from centrifugation vessel 12.

The sterile contents of centrifugation vessel 12 comprise a liquid filter medium 38 and an evacuated space 40 which may be a complete or a partial vacuum. Evacuated space 40 is maintained at a lower than atmospheric pressure at a predetermined value so that the centrifugation vessel can receive a known amount of liquid by injection through injectable closure member 16 without excessive pressure being built up within the interior thereof which would cause injectable closure members 14 and 16 to become dislodged from the openings within centrifugation vessel 12.

The liquid filter medium 38 can be any of the liquid filter media set forth in U.S. Pat. No. 3,928,139 for detecting microbial pathogens and generally, comprises an aqueous solution of any solute which is nontoxic to the microbial organisms being suspended, and has a density sufficiently high to suspend red and white blood cells or blood cell debris. The solute is preferably nonionic. Thus, the liquid filter medium has a density greater than blood, e.g., greater than about 1.06 gm/cc, and will suspend blood cells or blood cell debris, but yet will receive microbial pathogens. In addition, the liquid filter medium preferably contains a minor amount of a thermally sensitive gelling agent.

Suitable solutes which can be used in the liquid filter medium 38 include the sugars such as sucrose, glucose, maltose, fructose, mannitol, sorbitol, and the like. Generally, liquid filter medium 38 should be at least about 40 weight percent of the sugar and can contain the sugar up to the saturation limit thereof. Preferably, the sugars are contained within liquid filter medium 38 in the range of from about 40 to about 50 weight percent thereof. Generally, the sugars, and especially sucrose, are preferred solutes for liquid filter medium 38 because the liquid filter medium can be maintained at a physiological pH, i.e., 6.0–7.0 and when combined with gelatin, they can be autoclaved.

Any solute can be used in the scope of this invention so long as the resulting solution is more dense than red blood cells and red blood cell debris, and is nontoxic to the microbial pathogens. Other suitable such materials include a chemical commonly known as Hypaque sodium, $C_{11}H_8I_3N_2NaO_4$ (3,5-diacetamido-2,4,6-triidobenzoic acid sodium salt). This material can be utilized in aqueous solution in the same concentration as the sugar as described above. Another class of solutes which can be used to form the aqueous liquid filter medium in the scope of the subject invention includes macromolecular solutes which are capable of producing a liquid gel structure in aqueous media which have a pore size small enough to preclude red cells or red cell debris but large enough to pass microbial pathogens.

An example of a suitable such macromolecular solute is a water soluble crosslinked polymer having microporous openings throughout its solubilized network. A suitable such water soluble polymer includes a copolymer of sucrose and epichlorohydrin which has a weight average molecular weight in the range of from about 30,000 to about 500,000, and an intrinsic viscosity of about 0.17dl/g, a specific rotation $[\alpha]_D^{20}$ of +56.5° and contains dialyzable material in an amount of less than 1 weight percent. A suitable such polymer is sold under the trademark of "FICOLL" by Pharmacia Fine Chemicals, Inc. 800 Centennial Ave., Piscastaway, N.J. Another such polymer which can be used in the scope of this invention is dextran, having an average molecular weight in the range of about 10,000 to about 2,000,000 and preferably about 50,000. These polymers, when dissolved in water in accordance with the subject invention function as a liquid filter medium for microbial pathogens and apparently have microporous openings throughout their solubilized network in the range of from about 1 micron to about 7 microns.

The water soluble polymer or macromolecular solute is preferably present in the aqueous solution in the range of from about 10 to about 40 weight percent and more preferably from about 20 to about 30 weight percent thereof.

It is to understood that the term "thermally sensitive gelling agent" is meant any agent which will gel the aqueous solution of filter medium 38 at a temperature generally lower than room temperature but yet will liquefy at higher temperatures which are nondeleterious to the microbial pathogens, e.g., lower than about 50° C and generally no higher than about 42° C. Suitable thermosensitive gelling agents include any such gelling agent which is nondeleterious to the solution or to the sample being analyzed. Examples of suitable such materials include gelatins, i.e., the proteins obtained from collagen by boiling skin, ligaments, tendons, bones, and the like in water. Any suitable amount of thermally sensitive gelling agent can be utilized, e.g., about 0.5 to about 5 weight percent of filter medium 38.

In addition, in accordance with a preferred embodiment of the subject invention an oxygen scavenger and/or oxygen sensitive dye are included within the liquid filter medium. The presence of the oxygen scavenger will assure that the interior of the mixing and centrifugation device 10 is maintained at an anaerobic environment. More specifically, the medical profession is concerned about anaerobic bacterial infections of the human body. If the test for isolating and detecting microbial pathogens is carried out in aerobic environment, then it is quite apparent that the anaerobic bacteria will not be detected. Therefore, the presence of a minor effective amount of a reducing agent (a conventional oxygen scavenger) is utilized within the liquid filter medium 38 in the scope of a preferred embodiment of the subject invention. Reducing agents which can be used in the scope of the subject invention include L-cystine, sodium thioglycolate, ascorbic acid and the like. The preferred reducing substance which is used in the liquid filter medium 38 in the scope of the subject invention is a mixture of L-cystine and sodium thioglycolate. Furthermore, it is within the scope of a preferred embodiment of the subject invention to include a minor effective quantity of an oxygen sensitive dye in the liquid filter medium. The dye can be utilized either in the presence or the absence of the above disclosed reducing agent. The dye is preferably colorless in the absence of oxygen, but changes color when contact is made with oxygen. Thus a color change indicates that oxygen is present within the interior of the mixing and centrifugation device 10 which indicates the loss of the vacuum within the interior thereof. Suitable oxygen sensitive dyes which can be used in the scope of this invention include resazurin and methylene blue. Any other oxygen sensitive dye which is nondeleterious to the liquid filter medium 38 and the microbial separation process carried out within the interior of mixing and centrifugation device 10 can be used in the scope of the subject invention. A typical liquid filter medium which is used in the scope of the subject invention is as follows:

50% (w/w) sucrose
1.5% (w/w) gelatin
0.05% (w/v) L-cystine
0.05% (w/v) sodium thioglycolate
0.0001 - 0.0002% (w/v) resazurin
pH to 6.0

Generally, the reducing agent can comprise from about 0.01 to about 0.2% by weight of the liquid filter medium and the oxygen sensitive dye can comprise from about 0.001 to about 0.0005% by weight of the liquid filter medium.

Sample treating fluid 20 can contain any suitable ingredient or ingredients with which it is desired to treat the sample fluid before microbial pathogens are separated therefrom. In accordance with a specific embodiment of the subject invention, sample treating fluid 20 comprises an aqueous solution of a lysing agent for blood. Any suitable lysing agent can be utilized in the aqueous solution which is nontoxic to microorganisms. A suitable such lysing agent is a nontoxic aqueous solution of saponin. It must be noted that many saponins are thought to be toxic to microbial pathogens. However, as set forth in U.S. Pat. No. 3,883,425 issued May 13, 1975, entitled "DETOXIFICATION OF SAPONINS", which is herein incorporated by reference into this application, a new method is disclosed for removing the toxic ingredients from the heretofore thought to be toxic saponins. In general, the toxic saponin material can be detoxified in accordance with the invention set forth in that patent and the resulting purified material used in the scope of this invention. In addition, the aqueous solution can contain an anticoagulant and/or an oxygen scavenger. A preferred anticoagulant is sodium polyanethol sulfonate (SPS) or Heparin, for example. Sodium polyanethol sulfonate is preferred because it not only acts as an anticoagulant but also inhibits the phagocytic activity of granulocytes and monocytes and the normal antibacterial activity of serum and certain antibiotic, e.g., streptomycin and polymyxin.

The mixing and centrifugation apparatus of this invention provides a convenient and inexpensive method of combining a sample such as blood with a sample treating fluid such as that described above immediately prior to the depositing of the sample onto the liquid filter medium for testing. In several cases certain treating fluids, such as lysing agents, have been found to be incompatible with the liquid filter medium. Furthermore, even if the treating agents could be mixed with the liquid filter medium these agents would not be able to diffuse into the sample readily. For example, if a clot is not desired, the anticoagulant must be dispersed throughout the blood sample within a few minutes. However, if the anticoagulant was incorporated into the liquid filter medium, it would probably take about 24 hours for the anticoagulant to diffuse throughout the blood sample. Thus, it is undesirable to premix the treating fluid with the filter medium before sealing the filter medium in the sterile atmosphere of the centrifugation vessel. It is also undesirable to premix the treating fluid with the sample before introduction into the centrifugation vessel since this extra step provides an opportunity for contamination of the sample from the ambient conditions of the laboratory. The subject invention provides a means of mixing the sample with the treating fluid immediately prior to contact with the liquid filter medium in such a manner that the possibility of contamination from laboratory surroundings is held to a minimum. This is accomplished by previously supplying the treating fluid chamber 16*a* of the first injectable closure member 16 with a proper volume of sample treating fluid 20 in one of the manners suggested above. Once this is accomplished and the centrifugation vessel containing the liquid filter medium has been sealably closed with the first injectable closure member 16, the apparatus is ready for testing. Of course, the liquid filter medium will already have been deposited within the centrifugation vessel and the space above it evacuated in a sterile manner after sealing. The novel stylus 23 of FIGS. 9 and 10 used for injection of the sample is now inserted through the first injectable closure member 16 so that the apertures (or aperture) 24 and 26 along its wall are positioned within the treating fluid chamber 16*a* of the injectable closure member 16. Upon injection of the sample, it is contacted and mixed with the sample treating fluid in the manner set forth previously. The sample-sample treating fluid mixture is then deposited on the liquid filter medium.

Now referring to FIGS. 2–8, the use of mixing and centrifugation device 10 will be described in relation to a procedure for the detection of microbial pathogens. Liquid filter medium 38 can comprise 1.5 milliliters of an aqueous solution containing 3.0 parts by weight of gelatin, 97.0 parts by weight water, 100.0 parts by weight sucrose, 0.8 parts by weight L-cystine, 0.8 parts by weight sodium thioglycolate, and 0.0003 parts by weight resazurin, for example.

Sample treating fluid 20 can contain any suitable constituent such as a lysing agent and/or anticoagulant and, if desired, an oxygen scavenger or reducing agent in any desirable concentration. Any amount of an anticoagulant which is sufficient for the amount of blood sample and any amount of lysing agents sufficient to lyse the blood sample, can be used. For example, 0.3 milliliters of an aqueous solution containing about 12% by weight of nontoxic saponin and about 2% by weight sodium polyanethol sulfonate can be used as sample treating fluid 20. Initially, the mixing and centrifugation apparatus 10 is placed in an upright position as illustrated in FIG. 2 to allow the liquid filter medium 38 to pass downwardly against injectable closure member 14. Next, mixing and centrifugation device 10 is placed in a suitable cooling unit such as a refrigerator and is chilled sufficiently to cause the gelatin to solidify the liquid filter medium 38. For example, mixing and centrifugation device 10 can be chilled to 4° C. This step is illustrated in FIG. 3. Next, a sample fluid such as a blood sample (e.g. 8 ml) is obtained with syringe 42 which carries a conventional hypodermic needle. The conventional hypodermic needle is then replaced with the unique stylus 23 of the subject invention. Stylus 23 is then injected through injectable closure member 16 in the manner described above and the blood sample is then injected within the interior of the mixing and centrifugation device 10 in a manner schematically illustrated in FIG. 4. The turbulence caused by the blood passing into the evacuated space 40 will not disturb the liquid filter medium 38 which will remain as a solid bottom layer as illustrated in FIG. 4.

The mixing of the blood sample with sample treating fluid 20 containing the lysing agent will result in the red blood cells becoming lysed which will therefore minimize the possible trapping effect of erythrocytes. This trapping effect will generally comprise the erythrocytes or lymphocytes becoming stacked on the top of the liquid filter medium during the centrifugation step and the stacked cells trapping microbial pathogens as they are passed downwardly during centrifugation and thereby preventing such pathogens from reaching the liquid filter medium. Furthermore, the sodium polyanethol sulfonate within the sample treating fluid 20 acts as an anticoagulant and inhibits the phagocytic activity of granulocytes and monocytes and the normal antibacterial activity of the serum once it becomes admixed with the blood sample.

Next, stylus 23 is withdrawn from injectable closure member 16 and the mixing and centrifugation device 10 containing the congealed liquid filter medium 38 and the blood sample admixed with sample treating fluid 20, and illustrated as mixture 44 in FIGS. 4 and 5, is heated while in the upright position sufficiently to melt the gelatin and cause the liquid filter medium 38 to liquefy. Mixing and centrifugation device 10 is heated to a temperature which will not destroy any microbial pathogens which may be present in the blood sample, but which will be sufficient to liquefy the gelatin. For example, while in the position as illustrated in FIG. 5, mixing and centrifugation device 10 can be heated by immersion in a water bath to a temperature set at about 37° C–42° C. The liquefaction of the gelatin within the liquid filter medium 38 yields a liquefied solution which is now ready to function as a filter medium for the microbial pathogens.

The separation of the microbial pathogens from the remaining portion of the blood sample is accomplished by placing mixing and centrifugation device 10 into a suitable centrifugation apparatus and subject it to sufficient centrifugal force to separate the microbial pathogens from the remaining constituents in the blood sample. The speed and time of centrifugation can vary widely depending upon the strength of the material of which the centrifugation vessel is made and the type of centrifugation apparatus. The centrifugation can be conveniently accomplished by imparting between about 100 and 6000 gravities and preferably from about 1400–5000 gravities to mixing and centrifugation device 10. A suitable method includes a swinging bucket centrifuge rotor which imparts between 2000 and 4000 gravities for 10 to about 20 minutes to the particular system described in this preferred embodiment. The centrifugation step is illustrated schematically in FIG. 6 below.

After the mixing and centrifugation step described above, a sterile syringe 46 carrying a unique stylus 35 is injected through the second injectable closure member 14 of the centrifugation device as illustrated in FIG. 7. As illustrated, the stylus may be of any convenient length; however, apertures 36 in the wall of the stylus are positioned closely adjacent to the flat inner surface 18 of injectable closure member 14 upon injection of the stylus as shown in FIG. 7. Because the tip 34 of stylus 35 is pinched shut, the uniform thin layer of liquid filter medium lying adjacent to the flat inner surface of the injectable closure member 14 may be withdrawn. The flat inner surface of injectable closure member 14 provides a clear viewing area through the wall of the centrifugation vessel 10 so that the technician may easily observe as the filter medium is withdrawn. If desired, a conventional syringe and needle can be used to initially withdraw mixture 44 from centrifugation vessel 10 and thereafter admix the liquid filter medium and remove it therefrom by use of a stylus 35, for example.

Liquid filter medium 38 withdrawn by syringe 46 is next preferably agitated such as by shaking to cause the microbial pathogens to become thoroughly admixed and generally uniformly distributed therein. The liquid filter medium 38 containing the dispersed microbial pathogens is then distributed on suitable bacterial growth medium in the culture step which is schematically depicted as FIG. 8 in the drawing.

For example, with $1\frac{1}{2}$ milliliters of liquid filter medium containing microbial pathogens, one blood agar plate can receive 0.2 milliliters of the medium and the plate can be incubated at 37° C in an aerobic atmosphere. Another blood agar plate can receive 0.2 milliliters of an aqueous solution and can be incubated at 37° C in a candle jar. Another blood agar plate can receive 0.2 milliliters of the aqueous solution and can be incubated at 37° C in an anaerobic environment. Another 0.2 milliliters of the solution can be placed on a sabouraud agar plate and incubated at 25° C in an aerobic environment. Another 0.2 milliliters of the solution can be placed on an EMB plate (Eosin methylene blue dye) plate and incubated at 37° C in a candle jar. Another 0.5 milliliters of the solution can be placed in a liquid thioglycolate medium and incubated at 37° C. The growth medium can be checked daily for the presence of colonies. The number of microbial pathogens in 1 milliliter of blood can be determined by multiplying the number of colonies by a correction factor. This correction factor takes into consideration the recovery rate for a given organism, the volumes of blood and liquid filter solutions employed and the amount of final mixture plated. In the general example set forth above, the correction factor is 1.56.

It is noted that while the drawings depict a preferred embodiment of this invention for use in carrying out the above-described test for microbial pathogens, other embodiments may have slightly different configurations. For instance, a simple test tube may be substituted for centrifugation vessel 10. In that case, the injectable closure member 16 and the unique stylus 23 could be employed without the second injectable closure member 14. Indeed, the unique stylus and injectable closure member 16 (enclosing a treating fluid chamber) could be used in combination with any vessel where it is desirable to completely mix one fluid with a second fluid before contacting the resulting mixture with a third fluid contained within the vessel. The injectable closure member which comprises a treating fluid chamber could be shaped in any manner necessary to sealably close the vessel with which it is to be used. Thus, while this invention has been described in relation to its preferred embodiments, it is to be understood that various modifications thereof will be apparent to one skilled in the art from reading the specification and it is intended to cover such modifications as fall within the scope of the appended claims.

What is claimed is:

1. A fluid mixing apparatus comprising:

a. a receptacle having a first end and a second end, said ends being sealably closed so as to define a sample receiving chamber which is maintained at a lower than atmospheric pressure;

b. an injectable closure means sealably communicating with said first end of said receptacle;

c. an enclosed treating fluid chamber contained within said injectable closure means defined by sidewalls enclosed by first and second spaced injectable webs, said chamber being positioned therein such that a stylus may pass through said first and second spaced injectable webs, said treating fluid chamber and into said sample receiving chamber;

d. a sample treating fluid disposed within said treating fluid chamber; and e. injection stylus means for passing through said injectable closure means and into said sample receiving chamber via said first and second injectable webs and through said treating fluid chamber for injecting a sample fluid into said sample receiving chamber and for admixing said sample treating fluid from said treating fluid chamber with said sample fluid as said sample fluid passes therethrough.

2. The fluid mixing device of claim 1 wherein said injectable closure means comprises a tubular insert positioned within said first end of said receptacle said first injectable web enclosing the outer end of said tubular insert and said second injectable web enclosing the inner end of said tubular insert to thereby form said treating fluid chamber within said tubular insert.

3. The fluid mixing apparatus of claim 1 wherein the means for injecting a sample comprises a stylus for a syringe comprising an aperture, said aperture being spaced longitudinally along the wall of said stylus such that upon insertion of the stylus through the injectable closure means via said first and second injectable webs said aperture communicates with the treating fluid chamber.

4. The device of claim 3 wherein the tip of said stylus is sealed by collapsed sidewalls of the stylus at its tip and the wall of said stylus adjacent said collapsed tip carries an aperture therethrough.

5. The device of claim 4 wherein two apertures are provided in the wall of the stylus adjacent said tip.

6. The fluid mixing apparatus of claim 1 wherein the means for injecting a sample comprises a stylus for a syringe comprising:

a. a first aperture and a second aperture spaced longitudinally along the wall of said stylus such that both the first and the second apertures communicate with the treating fluid chamber upon injection of the stylus into said injectable closure means; and b. a means for blocking the flow of the sample fluid through said stylus provided between the first and second apertures.

7. The device of claim 6 wherein the tip of said stylus is sealed by collapsed sidewalls of the stylus at its tip and the wall of said stylus adjacent said collapsed tip carries an aperture therethrough.

8. The device of claim 7 wherein two apertures are provided in the wall of the stylus adjacent said tip.

9. The device of claim 6 wherein said blocking means comprises crimped sidewalls of said stylus between said first aperture and said second aperture.

10. A centrifugation and mixing apparatus comprising:

a. an enclosed elongated centrifugation vessel having a first end and a second end comprising a chamber containing an evacuated space maintained at lower than atmospheric pressure;

b. a first injectable closure means sealably closing said first end of said centrifugation vessel;

c. a second injectable closure means sealably closing said second end of said centrifugation vessel;

d. an enclosed treating fluid chamber contained within said first injectable closure means defined by sidewalls enclosed by first and second spaced injectable webs said chamber being spacially located such that a stylus injected through said first and second spaced injectable webs will pass through said treating fluid chamber and into said evacuated space;

e. a sample treating fluid disposed within said treating fluid chamber; and f. injection stylus means for passing through said first injectable closure means and into said evacuated space via said first and second injectable webs and through said treating fluid chamber for injecting a sample fluid into said evacuated space and for admixing said sample treating fluid from said treating fluid chamber with said sample fluid as said sample fluid passes therethrough.

11. The centrifugation and mixing apparatus of claim 10 wherein said first injectable closure means comprises a tubular insert positioned within said first end of said centrifugation vessel and said first injectable web enclosing the outer end of said tubular insert and said second injectable web enclosing the inner end of said tubular insert to thereby form said treating fluid chamber within said tubular insert.

12. The device of claim 11 wherein said second injectable closure means comprises an injectable cylindrical insert sealably closing the second end of said centrifugation vessel and wherein the inner surface of said cylindrical insert is flat.

13. The apparatus of claim 11 wherein the means for injecting a sample comprises a stylus for a syringe comprising an aperture, said aperture being spaced longitudinally along the stylus wall such that upon insertion of the stylus through said first injectable closure means via said first and second injectable webs said aperture communicates with the treating fluid chamber.

14. The apparatus of claim 13 in combination with a stylus for a syringe for removing fluid therefrom comprising a sealed tip and an aperture spaced longitudinally along the wall of said stylus such that upon injection of the stylus through said second injectable closure means said aperture is adjacent the inner face of said second injectable closure means.

15. The stylus of claim 14 wherein the tip is sealed by collapsed sidewalls of said stylus at its tip.

16. The stylus of claim 15 wherein two apertures are provided in the wall of said stylus such that upon injection of the stylus through said second injectable closure means said apertures are adjacent the inner face of said second injectable closure means.

17. the device of claim 13 wherein the tip of said stylus is sealed by collapsed sidewalls of the stylus at its tip and the wall of the stylus adjacent said collapsed tip carries an aperture therethrough.

18. The device of claim 17 wherein two apertures are provided in the wall of the stylus adjacent said tip.

19. The apparatus of claim 11 wherein the means for injecting a sample comprises a stylus for a syringe which comprises:

a. a first aperture and a second aperture spaced longitudinally along the wall of said stylus such that both the first and the second apertures communicate with the treating fluid chamber upon injection of the stylus into said first closure means; and b. a means for blocking the flow of the sample through said stylus provided between the first and the second aperture.

20. The apparatus of claim 19 in combination with a stylus for a syringe for removing fluid therefrom comprising a sealed tip and an aperture spaced longitudinally along the wall of said stylus such that upon injection of the stylus through said second injectable closure means said aperture is adjacent the inner face of said second injectable closure means.

21. The stylus of claim 20 wherein the tip is sealed by collapsed sidewalls of said stylus at its tip.

22. The stylus of claim 21 wherein two apertures are provided in the wall of said stylus such that upon injection of the stylus through said second injectable closure means said apertures are adjacent the inner face of said second injectable closure means.

23. The device of claim 19 wherein the tip of said stylus is sealed by collapsed sidewalls of the stylus at its tip and the wall of said stylus adjacent said collapsed tip carries an aperture therethrough.

24. The device of claim 23 wherein two apertures are provided in the wall of the stylus adjacent said tip.

25. The apparatus of claim 19 wherein said blocking means comprises crimped sidewalls of said stylus between said first aperture and said second aperture.

26. In an apparatus for mixing fluids having an elongated vessel comprising a sample receiving chamber and an injectable closure means the improvement comprising:

a. an enclosed treating fluid chamber defined by sidewalls enclosed by spaced first and second injectable webs, said chamber being contained within said injectable closure means and being positioned therein such that a stylus may pass through said spaced injectable webs, said treating fluid chamber and into said sample receiving chamber; and b. injection stylus means for passing through said injectable closure means and into said sample receiving chamber via said first and second injectable webs and through said treating fluid chamber for injecting a sample fluid into said sample receiving chamber and for admixing said fluid with a sample treatment fluid, as said sample fluid passes therethrough wherein the injection stylus means comprises a stylus for a syringe comprising:

a. a first aperture and a second aperture spaced longitudinally such that both the first and second apertures communicate with the treating fluid chamber upon injection of the stylus into said injectable closure means; and b. a means for blocking the flow of the sample fluid through said stylus provided between the first and second apertures.

27. The apparatus of claim 26 wherein said blocking means is provided by collapsed sidewalls of said stylus between said first aperture and said second aperture.

28. An apparatus used for the isolation and concentration of microbial pathogens from a sample fluid comprising:

a. an enclosed elongated centrifugation vessel having a first end and a second end and containing an evacuated space maintained at a lower than atmospheric pressure adjacent a sterile liquid filter medium which is non-toxic to said microbial pathogens and has a greater density than the sample fluid but is able to selectively receive microbial pathogens from said sample fluid;

b. a first injectable closure means sealably closing said first end of said elongated centrifugation vessel;

c. a second injectable closure means sealably closing said second end of said elongated centrifugation vessel;

d. an enclosed treating agent chamber contained within said first injectable closure means defined by sidewalls enclosed by first and second spaced injectable webs, said chamber being positioned therein such that a stylus injected through said first and second spaced injectable webs may pass through said treating fluid chamber and into said evacuated space;

e. a treating agent disposed within said treating agent chamber; and f. injection stylus means for passing through said injectable closure means and into said evacuated space via said first and second injectable webs and through said treating agent chamber for injecting a sample fluid into said evacuated space and for admixing said sample fluid with said treating agent as said sample fluid passes therethrough.

29. The apparatus of claim 28 wherein said liquid filter medium contains a minor effective amount of a thermally sensitive gelling agent.

30. The apparatus of claim 29 wherein said minor effective amount of said thermally sensitive gelling agent is from about 1 to about 5 wt % of said liquid filter medium.

31. The apparatus of claim 30 wherein said thermally sensitive gelling agent is gelatin.

32. The apparatus of claim 29 wherein said liquid filter medium is an aqueous solution of a sugar.

33. The apparatus of claim 32 wherein said sugar is sucrose.

34. The apparatus of claim 33 wherein said aqueous solution contains at least 40 wt % of said sucrose.

35. The apparatus of claim 29 wherein said liquid filter medium further contains a material selected from reducing agents and oxygen sensitive dyes and mixtures thereof.

36. The apparatus of claim 29 wherein said liquid filter medium is an aqueous solution of a macromolecular solute having microporous openings throughout its solubilized network, said openings being of sufficient size to selectively pass said pathogens from said sample fluid.

37. The apparatus of claim 36 wherein said polymer is epichlorohydrin-sucrose polymer having a molecular weight in a range of from about 300,000 to about 500,000 and a specific rotation $[\alpha]_D^{20}$ of + 56.5°.

38. The apparatus of claim 36 wherein said polymer is dextran having a molecular weight of from about 10,000 to about 2,000,000.

39. The apparatus of claim 28 wherein said first injectable closure means comprises a tubular insert positioned within said first end of said centrifugation vessel said first injectable web enclosing the outer end of said tubular insert and said second injectable web enclosing the inner end of said tubular insert to thereby form said treating agent chamber within said tubular insert.

40. The device of claim 28 wherein said second injectable closure means comprises an injectable cylindrical insert sealably closing the second end of said centrifugation vessel and wherein the inner surface of said cylindrical insert is flat.

41. The apparatus of claim 28 wherein the means for injecting a sample comprises a stylus for a syringe comprising an aperture, said aperture being spaced longitudinally along the wall of said stylus such that upon insertion of the stylus through said first closure means via said first and second injectable webs said aperture communicates with the treating agent chamber.

42. The apparatus of claim 41 in combination with a stylus for a syringe for removing fluid therefrom said stylus comprising a sealed tip and an aperture spaced longitudinally along its wall such that upon injection of the stylus through said second injectable closure means said aperture is adjacent the inner face of said second injectable closure means.

43. The stylus of claim 42 wherein the tip is sealed by collapsed sidewalls of the stylus at its tip.

44. The stylus of claim 43 wherein two apertures are provided in the wall of said stylus such that upon injection of the stylus through said second injectable closure means said apertures are adjacent the inner face of said second injectable closure means.

45. The device of claim 41 wherein the tip of said stylus is sealed by collapsed sidewalls of the stylus at its tip and the wall of said stylus adjacent said collapsed tip, carries an aperture therethrough.

46. The device of claim 45 wherein two apertures are provided in the wall of the stylus adjacent said tip.

47. The apparatus of claim 28 wherein the means for injecting a sample comprises a stylus for a syringe comprising:

a. a first aperture and a second aperture spaced longitudinally such that both the first and the second apertures communicate with the treating agent chamber upon injection of the stylus into said first injectable closure means; and b. a means for blocking the flow of the sample fluid through said stylus provided between the first and the second apertures.

48. The device of claim 47 wherein the tip of said stylus is sealed by collapsed sidewalls of the stylus at its tip and the wall of said stylus adjacent said collapsed tip carries an aperture therethrough.

49. The device of claim 48 wherein two apertures are provided in the wall of the stylus adjacent said tip.

50. The stylus of claim 47 wherein said blocking means comprises crimped sidewalls of said stylus between said first aperture and said second aperture.

51. The apparatus of claim 47 in combination with a stylus for a syringe for removing fluid therefrom said stylus comprising a sealed tip and an aperture spaced longitudinally along its wall such that upon injection of the stylus through said second injectable closure means said aperture is adjacent the inner face of said second injectable closure means.

52. The stylus of claim 51 wherein the tip is sealed by collapsed sidewalls of said stylus at its tip.

53. The stylus of claim 52 wherein two apertures are provided in the wall of said stylus such that upon injection of the stylus through said second injectable closure means said apertures are adjacent the inner face of said second injectable closure means.

* * * * *

UNITED STATES PATENT AND TRADEMARK OFFICE

CERTIFICATE OF CORRECTION

PATENT NO. : 4,038,150

DATED : July 26, 1977

INVENTOR(S) : Gordon L. Dorn; Joseph M. Hill

It is certified that error appears in the above-identified patent and that said Letters Patent are hereby corrected as shown below:

Col. 1, line 16, "stock" should be --shock--.

Col. 6, line 23, "to understood" should be --to be understood--.

Col. 12, line 60 (Claim 17), "the" should be --The--.

Signed and Sealed this

*Thirteenth* Day of *December 1977*

[SEAL]

*Attest:*

RUTH C. MASON
*Attesting Officer*

LUTRELLE F. PARKER
*Acting Commissioner of Patents and Trademarks*